(12) United States Patent
Lazzarini et al.

(10) Patent No.: US 12,521,686 B2
(45) Date of Patent: Jan. 13, 2026

(54) MACHINE FOR MAKING AND DISPENSING FOOD PRODUCTS INCLUDING A STIRRER WITH A LOCKING ELEMENT

(71) Applicant: ALI GROUP S.R.L.—CARPIGIANI, Cernusco Sul Naviglio (IT)

(72) Inventors: Roberto Lazzarini, Reggio Emilia (IT); Federico Tassi, Bologna (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 659 days.

(21) Appl. No.: 17/949,490

(22) Filed: Sep. 21, 2022

(65) Prior Publication Data
US 2023/0086925 A1    Mar. 23, 2023

(30) Foreign Application Priority Data
Sep. 22, 2021    (IT) ........................ 202021000004628

(51) Int. Cl.
*B01F 27/07*    (2022.01)
*A23G 9/22*    (2006.01)
(Continued)

(52) U.S. Cl.
CPC ............ *B01F 27/071* (2022.01); *A23G 9/224* (2013.01); *B01F 27/091* (2022.01);
(Continued)

(58) Field of Classification Search
CPC .......... A23G 9/224; A23G 9/045; A23G 9/04; A23G 9/22; A23G 9/08; A23G 9/28; B01F 15/00019; B01F 15/00058; B01F 15/0298; B01F 27/091; B01F 27/1124; B01F 27/1143; B01F 27/72; B01F 2101/2805; B01F 27/071; B01F 27/0726; B01F 27/1145; B01F 27/1921; B01F 27/112;
(Continued)

(56) References Cited

U.S. PATENT DOCUMENTS

| 969,016 | A | * | 8/1910 | Willmann | ............ B01F 27/091 366/311 |
| 2,243,317 | A | * | 5/1941 | Phelan | ................... A23G 9/163 366/288 |

(Continued)

FOREIGN PATENT DOCUMENTS

WO    WO-2015176473 A1 * 11/2015    ............... A23G 9/04

*Primary Examiner* — Charles Cooley
(74) *Attorney, Agent, or Firm* — SHUTTLEWORTH & INGERSOLL, PLC; Timothy J. Klima

(57) ABSTRACT

A machine for processing liquid or semi-liquid food products, includes: at least one container for containing the product to be processed; and at least one stirrer, mounted inside the container, to rotate about an axis of rotation. The stirrer includes at least: a first protuberance extending along the axis of rotation; a plurality of scraping elements, each provided with a cavity for accommodating the first protuberance; a first locking element, removably associable with the first protuberance and movable between an engaged position, where it is locked to the first protuberance to couple the scraping elements to the first protuberance, and a disengaged position, where it is movable relative to the first protuberance to allow uncoupling the scraping elements.

29 Claims, 8 Drawing Sheets

(51) Int. Cl.
*B01F 27/091* (2022.01)
*B01F 27/112* (2022.01)
*B01F 27/17* (2022.01)
*B01F 101/12* (2022.01)
*B01F 101/13* (2022.01)

(52) U.S. Cl.
CPC ............ *B01F 27/112* (2022.01); *B01F 27/17* (2022.01); *B01F 2101/12* (2022.01); *B01F 2101/13* (2022.01)

(58) Field of Classification Search
CPC .. B01F 27/17; B01F 2101/12; B01F 2101/13; B01F 35/561; B01F 27/808; C10B 7/02; C10B 7/10; C10B 53/07; C10B 47/34; C10B 47/44; B01J 6/008; B01J 19/20; F23G 7/12; F23G 2205/121; Y02P 20/143; C10G 1/10
USPC ............ 366/310, 312, 313, 309; 62/342–343
See application file for complete search history.

(56) References Cited

U.S. PATENT DOCUMENTS

| | | | | |
|---|---|---|---|---|
| 2,283,487 | A * | 5/1942 | Boileau | A23G 9/163 366/144 |
| 2,526,367 | A * | 10/1950 | Kaltenbach | A23G 9/16 416/219 A |
| 2,587,127 | A * | 2/1952 | Erickson | A23G 9/20 62/343 |
| 5,074,125 | A * | 12/1991 | Schifferly | A23G 9/224 366/312 |
| 5,312,184 | A * | 5/1994 | Cocchi | A23G 9/224 62/343 |
| 5,603,229 | A * | 2/1997 | Cocchi | A23G 9/28 366/144 |
| 10,624,364 | B2 * | 4/2020 | Cocchi | B01F 35/123 |
| 2005/0141343 | A1 * | 6/2005 | Hardy | B01F 27/091 366/311 |
| 2007/0140053 | A1 * | 6/2007 | Jejcic | B01F 27/091 366/311 |
| 2020/0221726 | A1 * | 7/2020 | Cocchi | A23G 9/08 |
| 2020/0397017 | A1 * | 12/2020 | Cocchi | A23G 9/228 |
| 2023/0086925 | A1 * | 3/2023 | Lazzarini | A23G 9/22 366/299 |

* cited by examiner

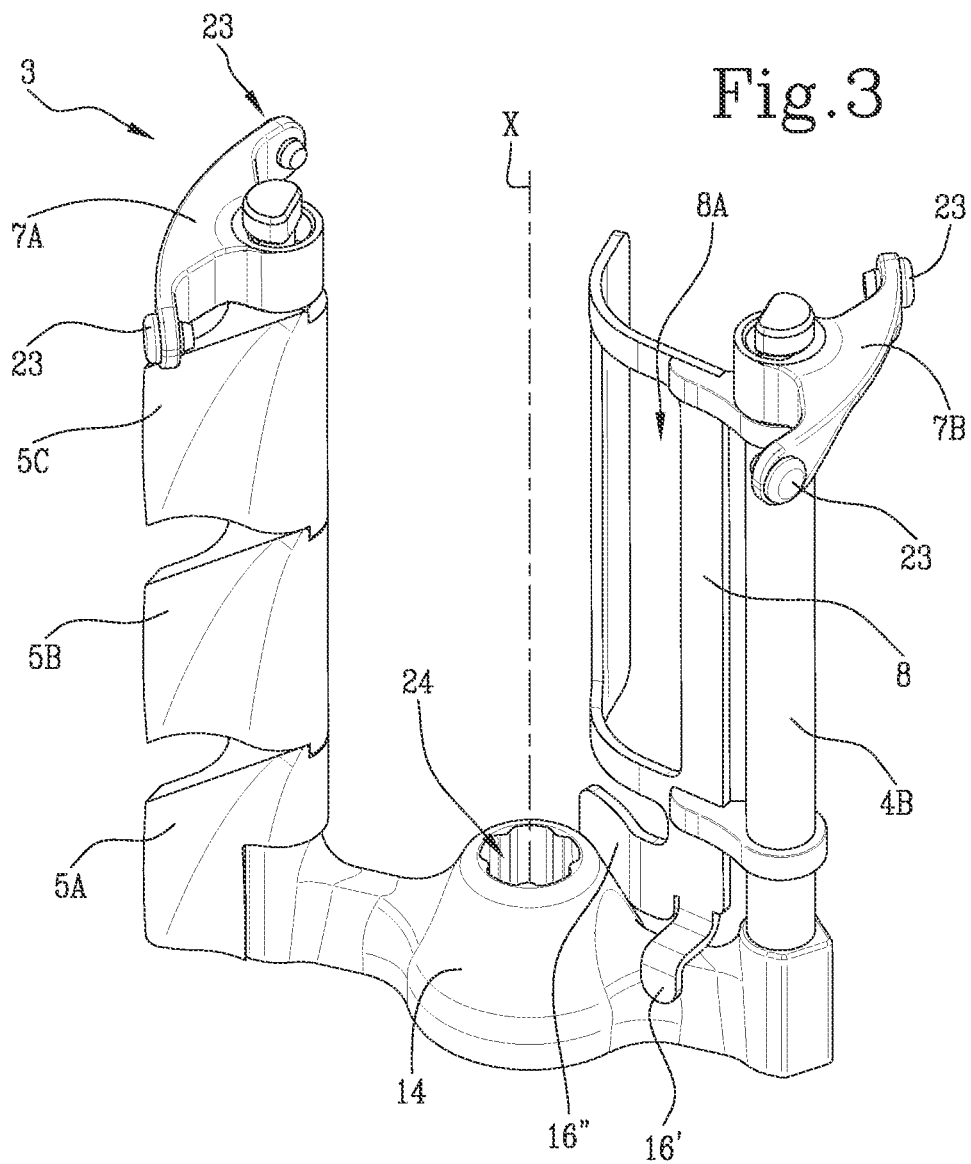
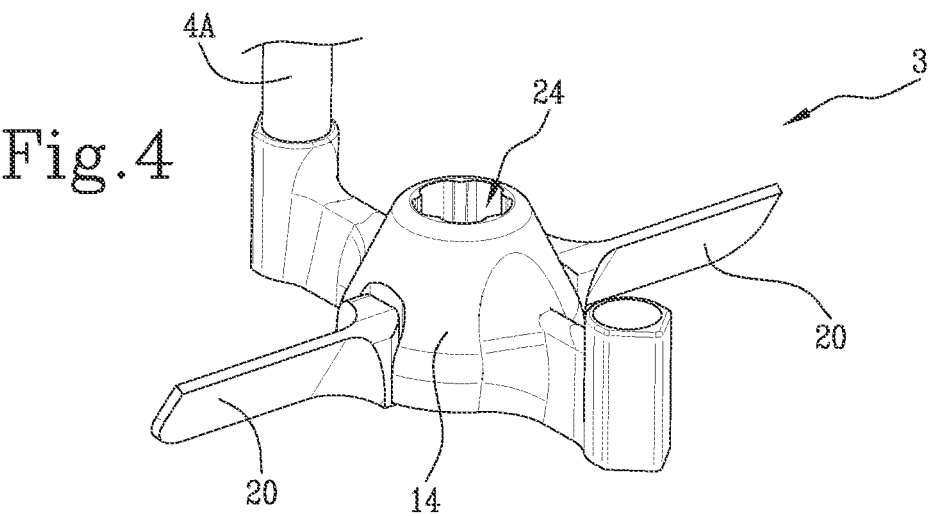

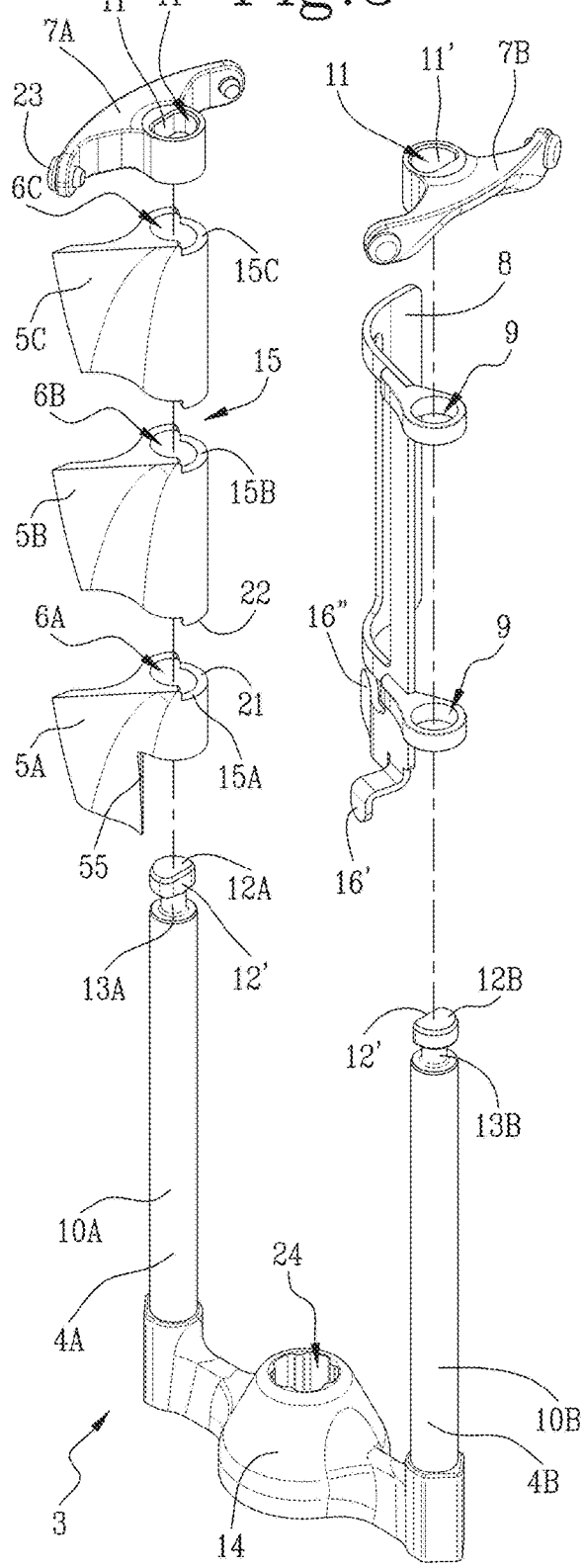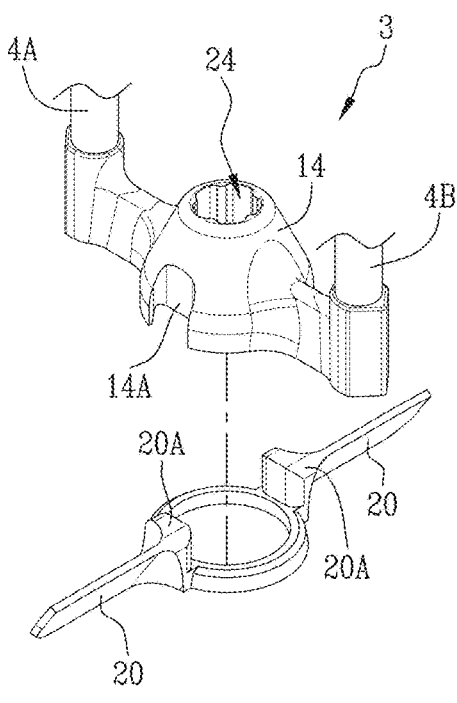

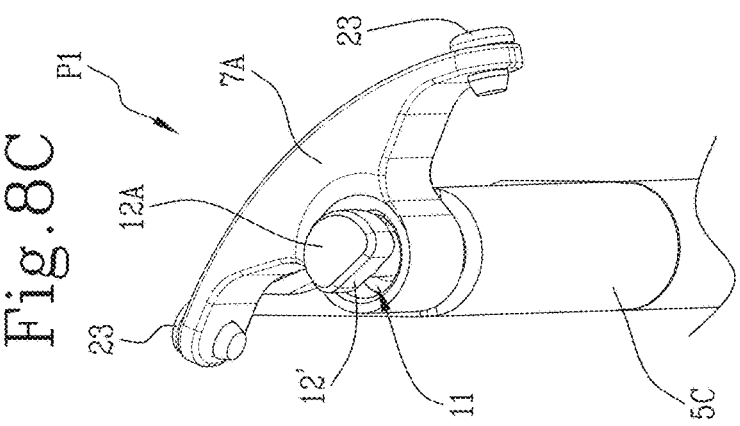
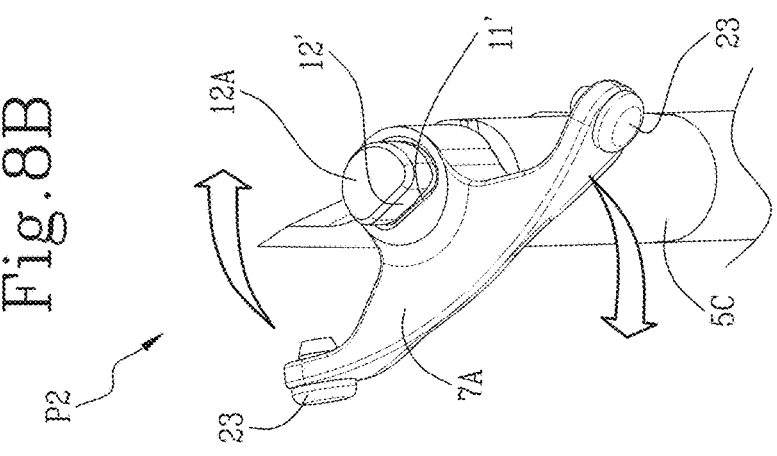
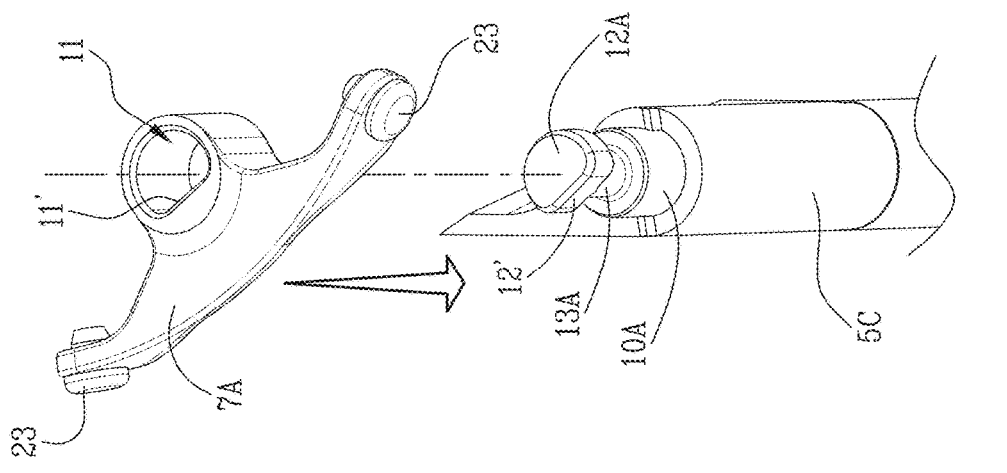

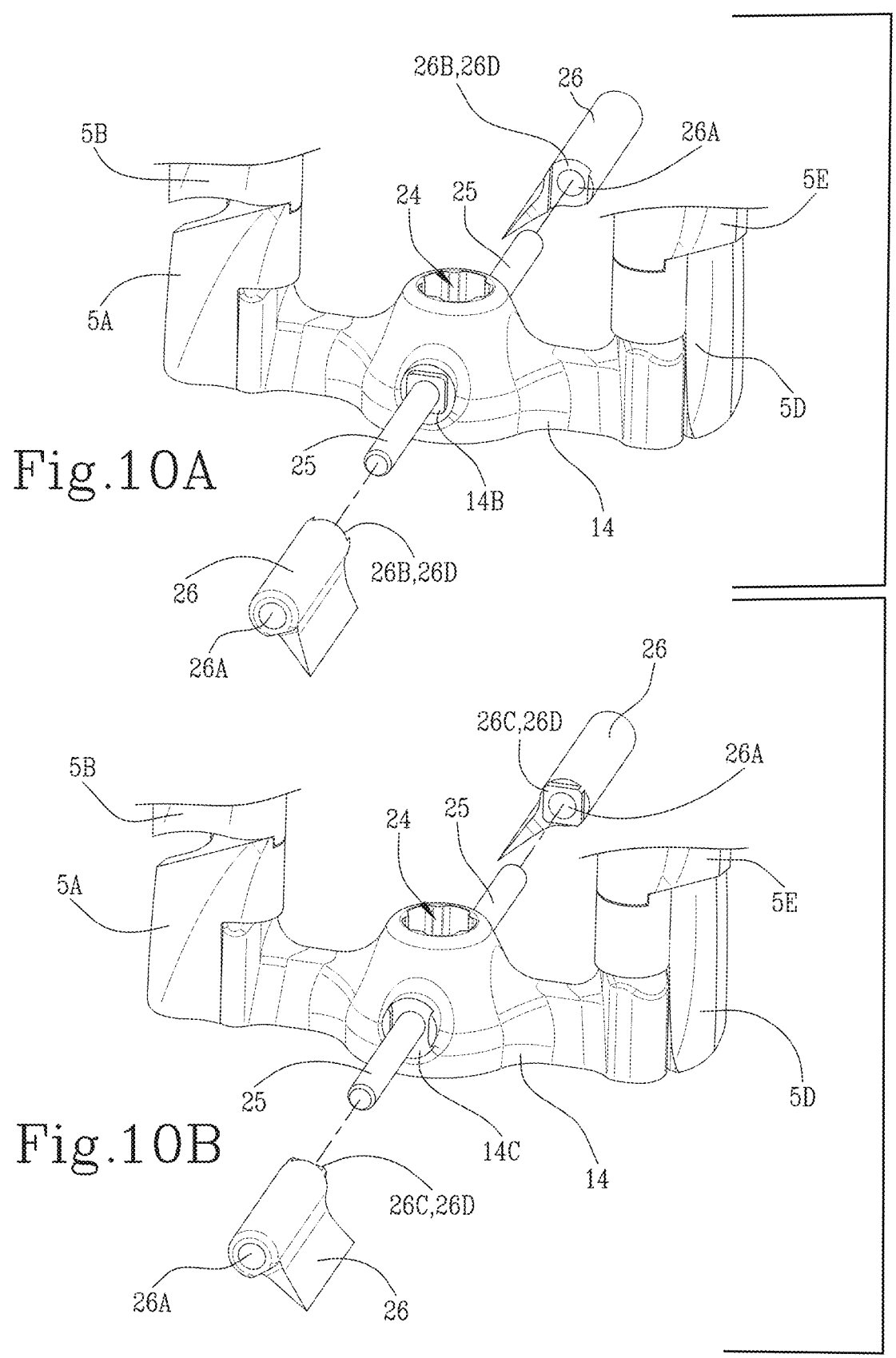

MACHINE FOR MAKING AND DISPENSING FOOD PRODUCTS INCLUDING A STIRRER WITH A LOCKING ELEMENT

This application claims priority to Italian Patent Application 202021000004628 filed Sep. 22, 2021, the entirety of which is incorporated by reference herein.

BACKGROUND OF THE INVENTION

This disclosure relates to a machine for making and dispensing (liquid and/or semi-liquid and/or semi-solid) food products.

More specifically, this innovation relates to machines for making and dispensing food products, such as, for example, ice creams, whipped cream, dessert creams, chocolate, yogurt, jams and the like.

Generally speaking, these machines comprise a container for containing the product to be processed, at least one dispensing tap mounted at the bottom of the front of the container and a stirrer mounted inside the container and used for mixing the product.

The product is processed mechanically by the stirrer.

Generally speaking, the function of the stirrer is, by way of non-limiting example, to work and mix the product to be dispensed and to ensure that the product has the required consistency.

Also known are stirrers that include scraping elements used to scrape the container so that all the product is processed uniformly and continuously.

Since the stirrer, precisely because of its function, remains in constant contact with the product, it needs to be cleaned thoroughly and frequently.

The machines of this disclosure can produce products of various different kinds and it may thus be necessary to use stirrers of different kinds.

In this trade, therefore, there is a need for the stirrer to be easily removed and replaced whenever necessary (for example, for cleaning and maintenance purposes or when changing over to a different type of product).

SUMMARY OF THE INVENTION

This innovation has for an aim to meet the above-mentioned need.

More specifically, the aim of this innovation is to provide a machine for making and dispensing liquid food products, wherein the stirrer is easy to remove and replace (for example, for cleaning and maintenance purposes or when changing over to a different type of product).

This aim is fully achieved by the machine of the innovation as characterized in the appended claims.

BRIEF DESCRIPTION OF THE DRAWINGS

The technical features and advantages of the innovation are more apparent in the following description of a preferred but non-limiting embodiment of it.

The description refers to the accompanying drawings, which are also provided purely by way of non-limiting example and in which:

FIG. 3 shows a perspective view of a first embodiment of a stirrer forming part of the machine of FIGS. 1 and 2;

FIG. 4 shows a perspective view of a detail of a second embodiment of a stirrer forming part of the machine of FIGS. 1 and 2;

FIGS. 5 and 6 show exploded perspective views of the stirrers illustrated in FIGS. 3 and 4, respectively;

FIGS. 8A, 8B and 8C show perspective views of a detail of the stirrers illustrated in FIGS. 3 and 4 in three different positions: an uncoupled, a disengaged and an engaged position, respectively;

FIGS. 10A and 10B show perspective views of a detail of two different embodiments of a stirrer forming part of the machine of FIGS. 1 and 2.

DESCRIPTION OF THE PREFERRED EMBODIMENTS

Figure 1:
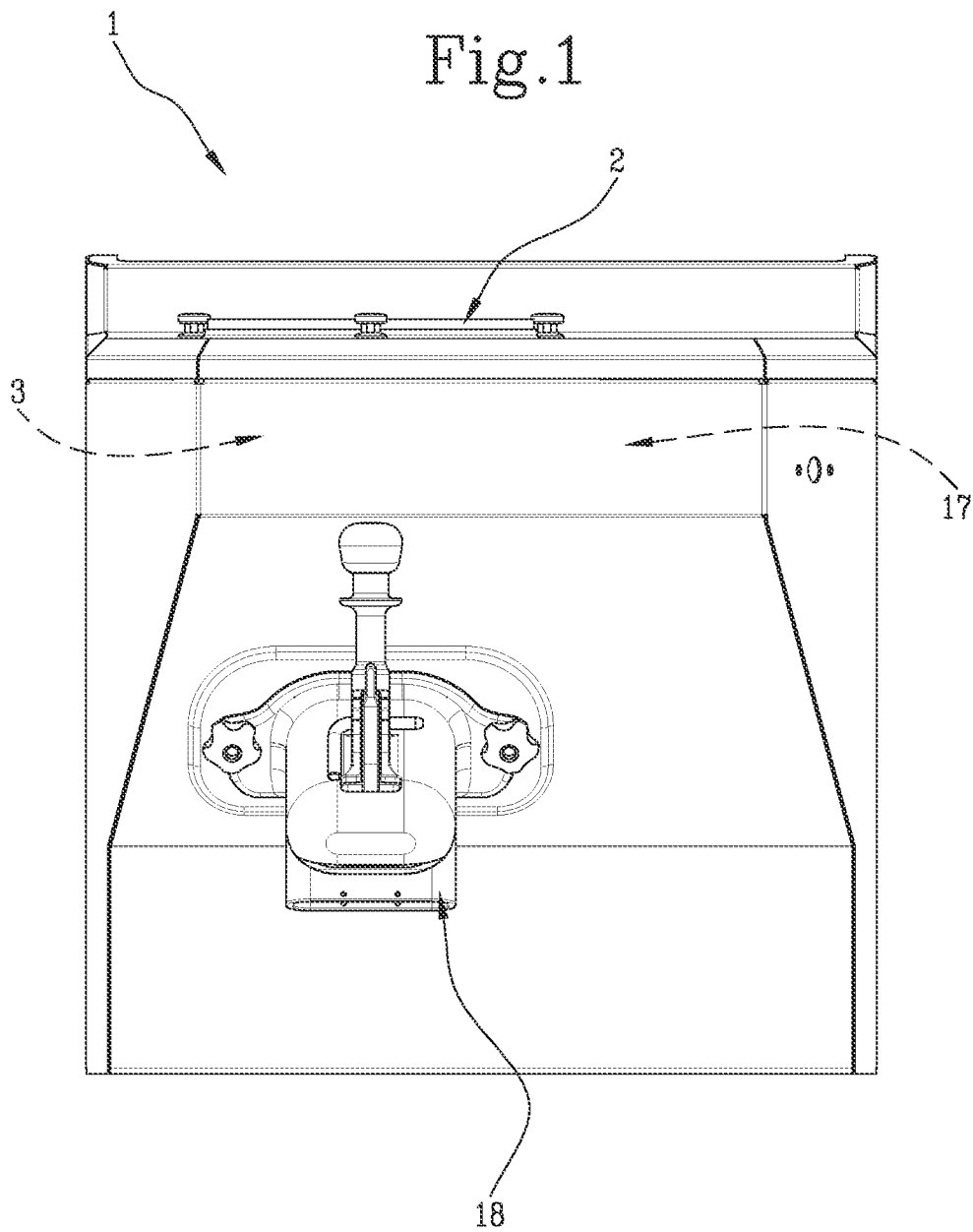
FIG. 1 shows a front view of the machine according to this innovation.
Figure 2:
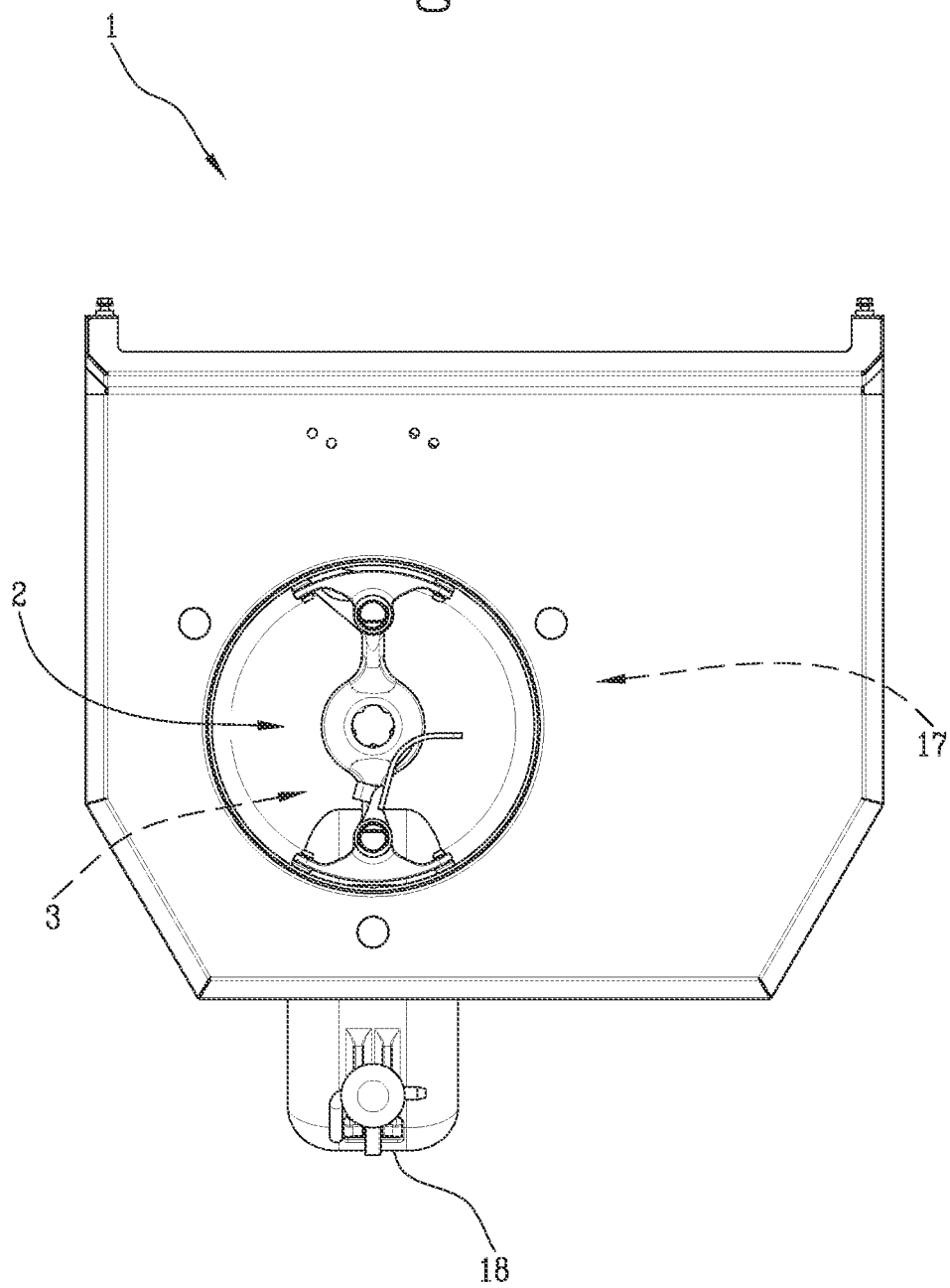
FIG. 2 shows a top view of the machine of FIG. 1.

With reference to the accompanying drawings, the numeral 1 denotes in its entirety a machine for making and dispensing food products preferably liquid or semi-liquid or semi-solid.

For example, the food products may be ice creams, whipped cream, dessert creams, chocolate, yogurt, jams or like products.

According to the disclosure, the machine 1 for making and dispensing food products comprises at least one container 2, for containing the product to be processed.

The container 2 comprises side and bottom walls.

According to the disclosure, the machine 1 for making and dispensing food products comprises at least one stirrer 3, mounted inside the container 2, to rotate about an axis of rotation X.

According to the disclosure, the stirrer 3 comprises at least a first protuberance 4A.

The first protuberance 4A extends parallel to the axis of rotation X.

The stirrer 3 comprises a plurality of scraping elements 5A, 5B, 5C.

Each of the scraping elements 5A, 5B, 5C is provided with a respective cavity 6A, 6B, 6C for accommodating the first protuberance 4A.

In a preferred embodiment, the cavities 6A, 6B, 6C are cylindrical in shape.

It should be noted that in the embodiment described, there are three scraping elements 5A, 5B, 5C but this is only a non-limiting example of the number of scraping elements, which may be more or less than three in number.

Advantageously, the presence of the scraping elements allows the stirrer 3 to prevent lumps of product from accumulating on the side walls on the inside of the container 2.

According to an aspect of this disclosure, the scraping elements 5A, 5B, 5C are coupled to each other by interlocking.

Interlocking the scraping elements 5A, 5B, 5C together prevents them from rotating relative to each other.

In a preferred embodiment, in at least one portion of the scraping elements 5A, 5B, 5C, the scraping elements 5A, 5B, 5C are each provided with a respective annular seat 15A, 15B, 15C defining a coupling zone 15.

The coupling zone 15 allows that portion of the scraping elements 5A, 5B, 5C to be coupled to another scraping element 5A, 5B, 5C.

This coupling prevents the scraping elements 5A, 5B, 5C from rotating relative to each other.

According to an aspect, each annular seat 15A, 15B, 15C is provided with a recess 21.

According to an aspect, each scraping element 5A, 5B, 5C is provided with a projection 22, configured to be coupled to the recess 21 of another scraping element 5A, 5B, 5C so as to define the aforementioned coupling that prevents them from rotating relative to each other.

Figure 7A:
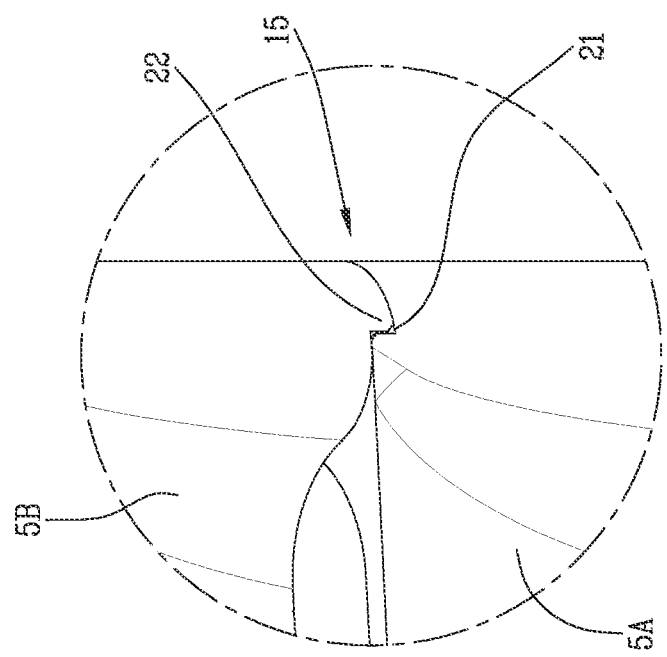
FIGS. 7A and 7B show perspective views of a detail of the stirrers illustrated in FIGS. 3 and 4 in an uncoupled position and a coupled position, respectively.
Figure 7B:
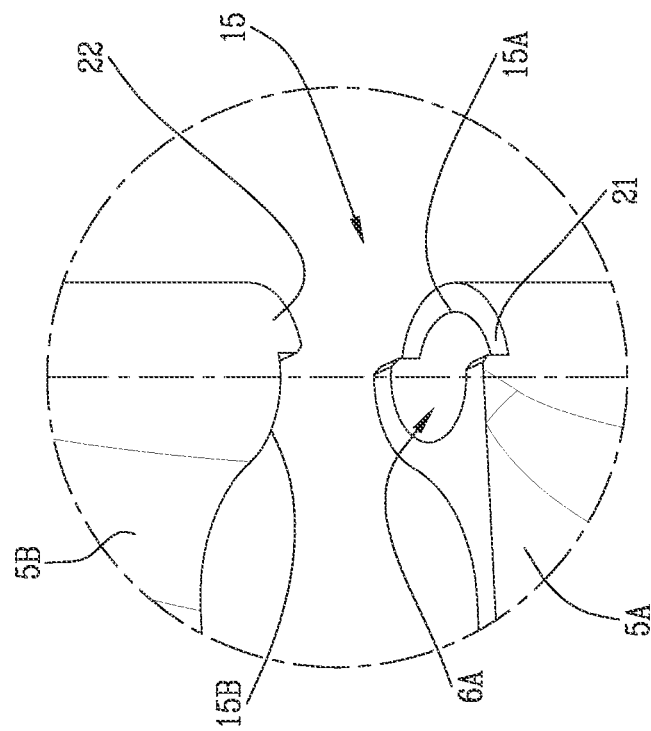

With reference in particular to FIGS. 7A and 7B, the recess 21 of one of the scraping elements 5A, 5B, 5C is coupled to a respective projection 22 of one of the other scraping elements 5A, 5B, 5C.

The coupling between the scraping elements 5A, 5B, 5C is a shape coupling.

In other words, according to an aspect, the scraping elements 5A, 5B, 5C are fitted on the first protuberance 4A, coupled to each other and interlocked in such a way as to prevent them from rotating relative to each other.

According to an aspect of this disclosure, the stirrer 3 comprises a base element 14.

According to an aspect, the machine 1 comprises a motor provided with a shaft that is configured to transmit motion to the stirrer 3.

The base element 14 has a cavity 24.

The cavity 24 of the base element 14 is shaped to match the shaft so that motion can be transmitted to the stirrer 3 by the shaft.

The first protuberance 4A is a feature of the base element 14.

In other words, the first protuberance 4A is connected (preferably fixed) to the base element 14.

In an embodiment, the scraping element 5A, of the scraping elements 5A, 5B, 5C, fitted on the first protuberance 4A and proximal to the base element 14, is provided with a portion 55 that is configured for abutting against the base element 14.

Advantageously, the abutting position of the portion 55 against the base element 14, combined with the interlocking connections between the scraping elements 5A, 5B, 5C, preventing them from rotating relative to each other, allows limiting the rotation of the scraping elements 5A, 5B, 5C about a direction parallel to the axis X.

In other words, the scraping elements 5A, 5B, 5C in their entirety are limited in their rotation and all the scraping elements 5A, 5B, 5C rotate simultaneously in the same way.

It should, however, be noted that, in use, the scraping elements 5A, 5B, 5C, because the bottom scraping element 5A is abutted against the side walls of the base element 14, are prevented from rotating when the stirrer 3 is set in rotation about the axis X.

Advantageously, the limited rotation of the scraping elements 5A, 5B, 5C allows them to remain in contact with the (side) wall on the inside of the container 2 and to effectively scrape the wall itself.

The stirrer 3 comprises a first locking element 7A.

The first locking element 7A is removably associable with the first protuberance 4A.

The first locking element 7A is movable between an engaged position P1, where it is locked to the first protuberance 4A to couple the scraping elements 5A, 5B, 5C to the first protuberance 4A, and a disengaged position P2, where it is movable relative to the first protuberance 4A to allow uncoupling the scraping elements 5A, 5B, 5C from the first protuberance 4A.

According to an aspect, the stirrer 3 comprises a second protuberance 4B.

The second protuberance 4B extends parallel to the axis of rotation X.

The second protuberance 4B is a feature of the base element 14.

In other words, the second protuberance 4B is connected to the base element 14.

The stirrer 3 comprises a vane 8.

The vane 8 is provided with a respective cavity 9 for accommodating the second protuberance 4B.

In a preferred embodiment, the vane 8 has a curved shape.

In a preferred embodiment, the vane 8 is provided with an additional cavity 8A.

Advantageously, the vane 8 allows mixing the product while, at the same time, reducing the friction between the product and the vane 8 itself, thanks also to the presence of the additional cavity 8A, which creates a "hollow" zone on the vane 8.

Advantageously, the vane 8 also allows breaking excessively dense lumps of product that can form inside the container 2, especially in the central zones thereof.

According to an aspect, the vane 8 is configured to be prevented from rotating relative to the second protuberance 4B.

The vane 8 is provided with protrusions 16' and 16".

The protrusions 16' and 16" are configured for preventing the vane 8 from rotating relative to the second protuberance 4B.

Advantageously, preventing the vane 8 from rotating relative to the second protuberance 4B allows the vane 8 itself to stir the product without rotating relative to the second protuberance 4B.

The protrusions 16',16", therefore, are configured to prevent the vane 8 from rotating relative to the base element 14.

Advantageously, preventing the vane 8 from rotating relative to the base element 14 allows the vane 8 itself to stir the product without rotating relative to the second protuberance 4B.

According to an aspect, the stirrer 3 comprises a second locking element 7B.

The second locking element 7B is removably associable with the second protuberance 4B.

The second locking element 7B is movable between an engaged position P1, where it is locked to the second protuberance 4B to couple the vane 8 to the second protuberance 4B, and a disengaged position P2, where it is movable relative to the second protuberance 4B to allow uncoupling the vane 8 from the second protuberance 4B.

In other words, the first locking element 7A and the second locking element 7B allow engaging or disengaging the scraping elements 5A, 5B, 5C relative to the first protuberance 4A and/or the vane 8 relative to the second protuberance 4B.

Advantageously, the disengaged position P2 of the first locking element 7A allows removing/fitting the scraping elements 5A, 5B, 5C from/to the first protuberance 4A.

Advantageously, the disengaged position P2 of the second locking element 7B allows removing/fitting the vane 8 from/to the second protuberance 4B.

Advantageously, removing and fitting the locking elements 7A, 7B allows operations to be carried out on the elements themselves.

The operations may be, for example, replacing, maintenance, cleaning.

The first locking element 7A is disposed at different angular positions around a direction parallel to the axis of rotation X between the engaged position P1 and the disengaged position P2.

The second locking element 7B is disposed at different angular positions around a direction parallel to the axis of rotation X between the engaged position P1 and the disengaged position P2.

With reference in particular to FIG. 5, the first protuberance 4A comprises at least a first portion 10A.

In an embodiment, the first portion 10A is cylindrical in shape.

The first protuberance 4A comprises at least a second portion 12A having a flat face 12'.

According to an aspect of this disclosure, the second portion 12A of the first protuberance 4A is disposed at the end of the first protuberance 4A.

The first protuberance 4A comprises at least a third portion 13A with a narrow cross section.

The third portion 13A is interposed between the first portion 10A and the second portion 12A.

The second protuberance 4B comprises at least a first portion 10B.

In an embodiment, the first portion 10B is cylindrical in shape.

The second protuberance 4B comprises at least a second portion 12B having a flat face 12'.

According to an aspect of this disclosure, the second portion 12B of the second protuberance 4B is disposed at the end of the second protuberance 4B.

The second protuberance 4B comprises at least a third portion 13B with a narrow cross section.

The third portion 13B is interposed between the first portion 10B and the second portion 12B.

In a preferred embodiment, the second portions 12A, 12B are distal to the base element 14 and the first portions 10A, 10B are proximal to the base element 14.

The scraping elements 5A, 5B, 5C are fitted on the first, cylindrical portion 10A of the first protuberance 4A.

The vane 8 is fitted on the first, cylindrical portion 10B of the second protuberance 4B.

The first locking element 7A comprises a hollow seat 11 for accommodating the first protuberance 4A.

The hollow seat 11 has a flat face 11'.

The hollow seat 11 of the first locking element 7A is shaped to match the shape of the second portion 12A of the first protuberance 4A.

In other words, the hollow seat 11 and the second portion 12A are shaped to match each other.

In other words, thanks to the shape of the hollow seat 11 and of the second portion 12A, the first locking element 7A can be fitted at least on the second portion 12A of the first protuberance 4A.

It should be noted, however, that the first locking element 7A can be fitted on the second portion 12A only at a predetermined angular position; more precisely, fitting is possible at the angular position where the two flat faces (11'; 12') of the hollow seat 11 and of the locking element 7A, respectively, face each other.

The second locking element 7B comprises a hollow seat 11 for accommodating the second protuberance 4B.

The hollow seat 11 of the second locking element 7B is shaped to match the shape of the second portion 12B of the second protuberance 4B.

In other words, the hollow seat 11 and the second portion 12B are shaped to match each other.

In other words, thanks to the shape of the hollow seat 11 and of the second portion 12B, the second locking element 7B can be fitted at least on the second portion 12B of the second protuberance 4B.

It should be noted, however, that the second locking element 7B can be fitted on the second portion 12B only at a predetermined angular position; more precisely, fitting is possible at the angular position where the two flat faces (11'; 12') of the hollow seat 11 and of the locking element 7B, respectively, face each other.

According to an aspect of this disclosure, when the first locking element 7A is at the third, narrow portion 13A, the third narrow portion 13A allows the first locking element 7A to move (that is, rotate about an axis parallel to the axis X) from the disengaged position P2, where it is movable (longitudinally) relative to the first protuberance 4A, to allow the scraping elements 5A, 5B, 5C to be uncoupled, to the engaged position P1, where it is longitudinally locked to the first protuberance 4A to couple the scraping elements 5A, 5B, 5C to the first protuberance 4A, or vice versa, from the position P1 to the position P2.

In a preferred embodiment, the movement of the first locking element 7A from the disengaged position P2 to the engaged position P1 and vice versa, is a rotation by 180° of the first locking element 7A itself about a direction parallel to the axis of rotation X.

In particular, FIGS. 8A, 8B and 8C illustrate the sequence of steps whereby the first locking element 7A is locked/coupled to the first protuberance 4A.

The first locking element 7A is configured to be fitted on the third portion 13A, with the narrow cross section.

The first locking element 7A is configured to be prevented from sliding down along the first, cylindrical portion 10A; in effect, the cross section of the cavity 11 of the first locking element 7A is smaller than the cross section of the first portion 10A so that fitting of one on the other is prevented.

The first locking element 7A is configured to be able to rotate about a direction parallel to the axis of rotation X when fitted on the third portion 13A.

As illustrated in FIG. 8C, at the position P1, the shape of the hollow seat 11 and of the second portion 12A prevents the first locking element 7A from moving longitudinally relative to the second portion 12A so that the first locking element 7A is prevented from being disengaged from the first protuberance 4A.

That way, advantageously, the first locking element 7A, when it is at the engaged position P1, can be used as a grip to remove or fit or, more generally speaking, lift, the stirrer 3.

Advantageously, the stirrer 3 can thus be removed from or fitted into the container 2 extremely easily.

Advantageously, coupling the scraping elements 5A, 5B and 5C to the first protuberance 4A means that none of them can come away from the stirrer 3 while the stirrer 3 is mechanically working the product.

In a preferred embodiment, the dimensions of the first, cylindrical portion 10A, the third, narrow portion 13A, the first locking element 7A and the scraping elements 5A, 5B, 5C along a direction parallel to the axis of rotation X are such that when the stirrer 3 is in use (with the locking element 7A at the engaged position P1), the first locking element 7A is disposed at the third portion 13A with the narrow cross section.

Advantageously, moving the first locking element 7A to the disengaged position P2 allows some of the components of the stirrer 3 to be easily extracted/disassembled.

In effect, the scraping elements 5A, 5B, 5C can be removed from the first protuberance 4A.

Advantageously, removing some of the components of the stirrer 3 allows them to be, for example, replaced, subjected to maintenance or cleaned.

According to an aspect of this disclosure, when the second locking element 7B is at the third portion 13B, the third narrow portion 13B allows the second locking element 7B to move from the disengaged position P2, where it is movable (longitudinally) relative to the second protuberance 4B, to allow the vane 8 to be uncoupled, to the engaged position P1, where it is locked to the second protuberance 4B to couple the vane 8 to the second protuberance 4B, or vice versa, from the position P1 to the position P2.

In a preferred embodiment, the movement of the second locking element 7B from the disengaged position P2 to the engaged position P1 and vice versa, is a rotation by a predetermined angle (preferably between 20° and 180°) of the second locking element 7B itself about a direction parallel to the axis of rotation X.

The second locking element 7B is configured to be fitted on the second protuberance 4B thanks to the matching shapes of the second portion 12B and the hollow seat 11.

The second locking element 7B is configured to be fitted on the third portion 13B, with the narrow cross section.

The second locking element 7B is configured to be prevented from sliding down along the first, cylindrical portion 10B.

The second locking element 7B is configured to be able to rotate about a direction parallel to the axis of rotation X when fitted on the third portion 13B.

At the position P1, the shape of the hollow seat 11 and of the second portion 12B prevents the second locking element 7B from moving longitudinally relative to the second portion 12B so that the second locking element 7B is prevented from being disengaged from the second protuberance 4B.

That way, advantageously, the second locking element 7B, when it is at the engaged position P1, can be used as a grip to remove or fit or, more generally speaking, lift, the stirrer 3.

Advantageously, the stirrer 3 can thus be removed from or fitted into the container 2 extremely easily.

Advantageously, coupling the vane 8 to the second protuberance 4B means that it cannot come away from the stirrer 3 while the stirrer 3 is mechanically working the product.

In a preferred embodiment, the dimensions of the first, cylindrical portion 10B, the third, narrow portion 13B, the second locking element 7B and the vane 8 along a direction parallel to the axis of rotation X are such that when the stirrer 3 is in use, the second locking element 7B is disposed at the third portion 13B with the narrow cross section.

Advantageously, moving the second locking element 7B to the disengaged position P2 allows some of the components of the stirrer 3 to be easily extracted/disassembled.

Advantageously, removing some of the components of the stirrer 3 allows them to be, for example, replaced, subjected to maintenance or cleaned.

In a preferred embodiment, the first locking element 7A has at least one contact element 23 by which the stirrer 3 and the container 2 come into contact.

In a preferred embodiment, the second locking element 7B has at least one contact element 23 by which the stirrer 3 and the container 2 come into contact.

According to an aspect, each contact element 23 is removably associated with the first locking element 7A or the second locking element 7B.

According to an aspect, the contact element 23 is made from plastic material, such as, by way of a non-limiting example, elastomeric material.

Advantageously, the presence of the contact elements 23 limits the contact surface area between the components of the stirrer 3 other than the scrapers and the (side) walls of the container 2.

Advantageously, the presence of the contact elements 23 reduces wear due to friction between the locking elements 7A, 7B and the (side) walls of the container 2 during rotation of the stirrer 3 while in use.

Advantageously, both of the contact elements 23 are removable and can thus be replaced when worn.

Advantageously, by keeping both the first locking element 7A and the second locking element 7B at the engaged position P1, it is possible to easily remove the entire stirrer 3, with all its components, from the machine 1.

In effect, the first locking element 7A and the second locking element 7B define a sort of handgrip with which a user can handle the stirrer 3.

Advantageously, once the stirrer 3 has been taken out of the machine 1, the different components of the stirrer 3 can be disassembled by moving the first locking element 7A and the second locking element 7B to the disengaged position P2.

Figure 9:
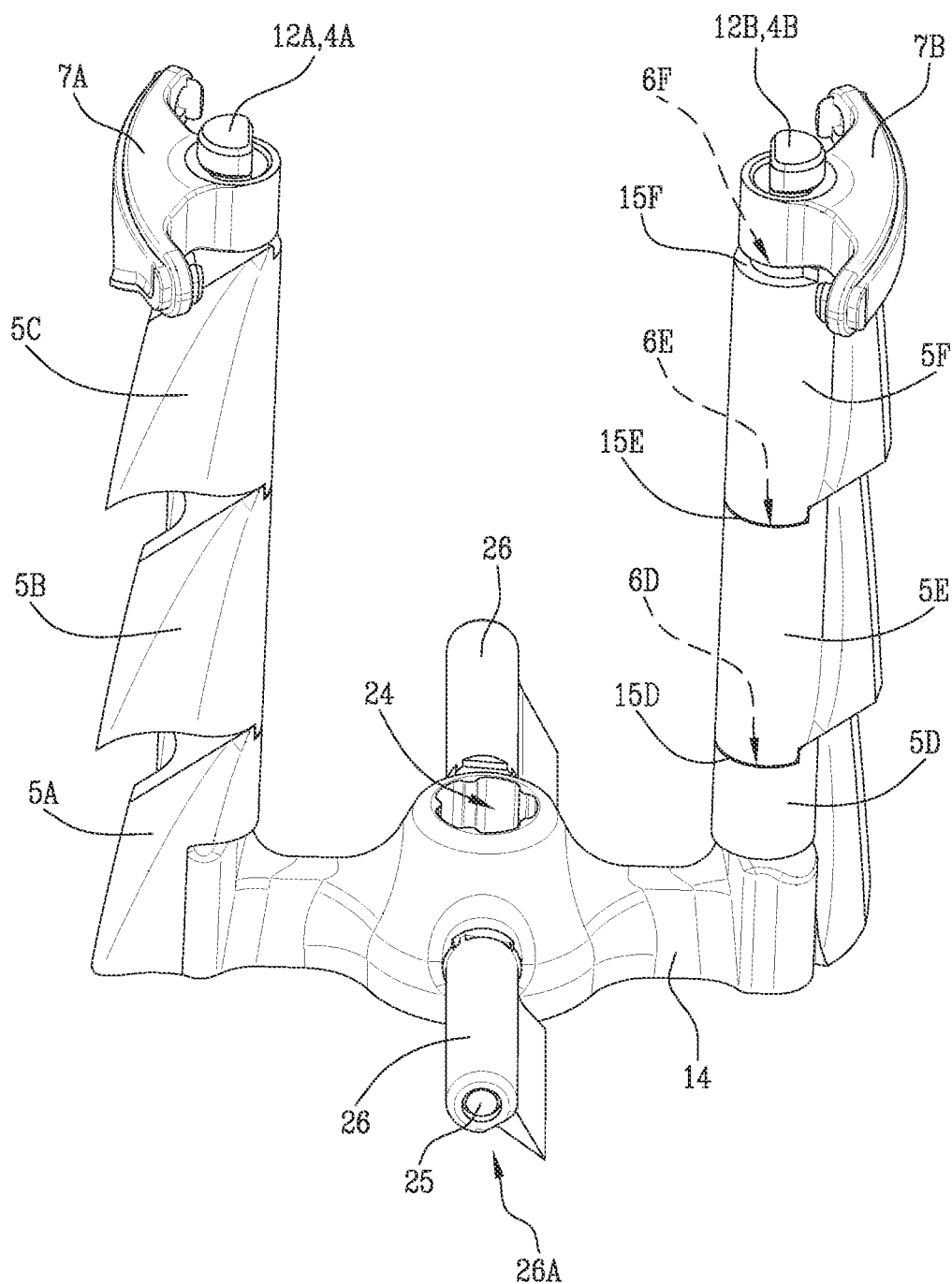
FIG. 9 shows a perspective view of a third embodiment of a stirrer forming part of the machine of FIGS. 1 and 2.

In a third embodiment, illustrated in FIG. 9, the stirrer 3 comprises an additional plurality of scraping elements 5D, 5E, 5F.

Each of the additional scraping elements 5D, 5E, 5F is provided with a respective cavity 6D, 6E, 6F for accommodating the second protuberance 4B.

In a preferred embodiment, the cavities 6D, 6E, 6F are cylindrical in shape.

It should be noted that the second locking element 7B is, in this embodiment, associated with the additional scraping elements 5D, 5E, 5F.

The additional scraping elements 5D, 5E, 5F are each provided, at least at one portion of them, with an additional annular seat 15D, 15E, 15F, defining a coupling zone 15 which allows coupling to another additional scraping element 5D, 5E, 5F of the plurality of additional scraping elements 5D, 5E. 5F in order to prevent them from rotating relative to each other.

It should be noted that the additional scraping elements 5D, 5E, 5F have the same features and functions as the scraping elements 5A, 5B, 5C described above in this disclosure; therefore, what is set out above with regard to the scraping elements 5A, 5B, 5C is also applicable, where not incompatible, to the additional scraping elements 5D, 5E, 5F.

With reference in particular to a second embodiment, illustrated in FIG. 4, the stirrer 3 comprises at least one radial vane 20.

The radial vane 20 protrudes radially from the base element 14.

In an embodiment, the stirrer 3 comprises a pair of radial vanes 20.

According to an aspect, at least one radial vane 20 is removable from the base element 14.

In an embodiment, at least one radial vane 20 is configured to be connected to the base element 14 through a shape coupling.

The radial vane 20 comprises a projection 20A.

The base element 14 comprises a recess 14A.

The projection 20A of the radial vane 20 is configured to be coupled to the corresponding recess 14A of the base element 14.

Advantageously, the presence of at least one radial vane 20 allows scraping a bottom wall of the container 2.

In other words, each radial vane 20 is an additional scraper that allows scraping a wall (the bottom) other than the (side) walls scraped by the scraping elements 5A, 5B, 5C.

In a fourth embodiment, illustrated in FIGS. 10A and 10B, the base element 14 is provided with at least one protrusion 25.

In other words, the at least one protrusion 25 is connected to the base element 14.

The at least one protrusion 25 extends radially.

In a preferred embodiment, the base element 14 is provided with two protrusions 25.

In other words, the two protrusions 25 are connected to the base element 14.

The stirrer 3 comprises an additional vane 26 for each of the protrusions 25 on the base element 14.

Each additional vane 26 is removably coupled to the corresponding protrusion 25.

According to an aspect of this disclosure, the additional vane 26 comprises a cavity 26A.

The cavity 26A and the respective protrusion 25 are configured to be coupled to each other.

According to an aspect, the additional vane 26 has an end 26D.

The end 26D of the additional vane 26 is proximal to the base element 14.

The end 26D of the additional vane 26 is configured to be coupled to the base element 14 through a shape coupling.

In an embodiment, the end 26D of the additional vane 26 comprises a female portion 26B and the base element 14 comprises a corresponding male portion 14B shaped to match the female portion 26B.

The female portion 26B and the corresponding male portion 14B are configured to be coupled to each other.

According to an aspect of this disclosure, the female portion 26B of the end 26D of the additional vane 26 and the male portion 14B of the base element 14 are shaped in such a way that when coupled to each other, they prevent the additional vane 26 from rotating about an axis of rotation perpendicular to the axis of rotation X.

In an alternative embodiment, the end 26D of the additional vane 26 comprises a male portion 26C and the base element 14 comprises a corresponding female portion 14C shaped to match the male portion 26C.

The male portion 26C and the corresponding female portion 14C are configured to be coupled to each other.

According to an aspect of this disclosure, the male portion 26C of the end 26D of the additional vane 26 and the female portion 14C of the base element 14 are shaped in such a way that when coupled to each other, they prevent the additional vane 26 from rotating about an axis of rotation perpendicular to the axis of rotation X.

Advantageously, the presence of an additional radial vane 26 allows scraping a wall (the bottom) of the container 2.

Advantageously, preventing the additional vane 26 from rotating about an axis of rotation perpendicular to the axis of rotation X allows the additional vane 26 to remain in contact with an inside wall (the bottom) of the container 2 and to effectively scrape it.

According to an aspect of this disclosure, the machine 1 comprises thermal treatment means 17.

The thermal treatment means 17 are associated with the container 2 to thermally treat the product contained therein.

According to an aspect, the thermal treatment means 17 comprise at least one thermodynamic system.

The thermodynamic system comprises a closed circuit.

The thermodynamic system comprises at least one heat exchanger, for example, a condenser for heating the product and/or an evaporator for cooling the product.

According to an aspect of this disclosure, the machine 1 comprises a dispensing tap 18.

The dispensing tap 18 is mounted on an outlet opening of the container 2.

The tap 18 allows or prevents dispensing the product from the machine 1.

What is claimed is:

1. A machine for processing liquid or semi-liquid food products, comprising:
    at least one container for containing the product to be processed;
    at least one stirrer, mounted inside the at least one container, to rotate about an axis of rotation;
    wherein the at least one stirrer comprises at least:
        a first protuberance extending parallel to the axis of rotation;
        a plurality of scraping elements, each including a cavity for accommodating the first protuberance;
        a first locking element, removably connectable to the first protuberance and movable between an engaged position, where the first locking element is locked to the first protuberance to couple the scraping elements to the first protuberance, and a disengaged position, where the first locking element is movable relative to the first protuberance to allow uncoupling the scraping elements;
        wherein the first locking element includes at least one contact element by which the at least one stirrer and the at least one container come into contact, said at least one contact element being removably connectable to the first locking element.

2. The machine according to claim 1, wherein the stirrer further comprises:
    a second protuberance extending parallel to the axis of rotation;
    a vane including a respective cavity for accommodating the second protuberance or an additional plurality of scraping elements, each including an additional cavity for accommodating the second protuberance;
    a second locking element, removably connectable to the second protuberance and movable between an engaged position, where the second locking element is locked to the second protuberance to couple the vane or the additional scraping elements to the second protuberance, and a disengaged position, where the second locking element is movable relative to the second protuberance to allow uncoupling the vane or the additional scraping elements.

3. The machine according to claim 2, wherein the first and/or the second locking element is disposed at different angular positions around a direction parallel to the axis of rotation between the engaged position and the disengaged position.

4. The machine according to claim 2, wherein the second locking element includes at least one second contact element by which the at least one stirrer and the at least one container come into contact, said at least one second contact element being removably connectable to the second locking element.

5. The machine according to claim 2, wherein the first and/or the second protuberance comprises at least a first, cylindrical portion and wherein the scraping elements, and/or the vane or the additional scraping elements, are fitted on the first, cylindrical portion of the first protuberance and/or of the second protuberance, respectively.

6. The machine according to claim 1, wherein the at least one stirrer comprises a base element to which at least the first protuberance is attached.

7. The machine according to claim 6, and further comprising a motor including a shaft and wherein the base element includes a cavity, the cavity being shaped to match the shaft.

8. The machine according to claim 6, wherein the base element includes at least one protrusion and wherein the at least one stirrer also comprises an additional vane for each at least one protrusion, the additional vane being removably coupled to the at least one protrusion.

9. The machine according to claim 8, wherein the additional vane comprises a cavity configured to receive the at least one protrusion.

10. The machine according to claim 8, wherein the additional vane is coupled to the base element through a shape coupling.

11. The machine according to claim 8, wherein the additional vane has an end proximal to the base element, the end being configured to be coupled to the base element through a shape coupling.

12. The machine according to claim 11, wherein the end of the additional vane comprises a female portion and the base element comprises a male portion, the female portion of the end of the additional vane being configured to be coupled to the male portion of the base element.

13. The machine according claim 11, wherein the end of the additional vane comprises a male portion and the base element comprises a female portion, the male portion of the end of the additional vane being configured to be coupled to the female portion of the base element.

14. The machine according to claim 1, wherein the at least one stirrer further comprises a second protuberance extending parallel to the axis of rotation and a base element, to which the first and/or the second protuberance is attached and also comprises at least one radial vane protruding radially from the base element.

15. The machine according to claim 14, wherein the at least one radial vane comprises a pair of radial vanes protruding radially from the base element.

16. The machine according to claim 14, wherein the at least one radial vane is removable from the base element.

17. The machine according to claim 16, wherein the at least one radial vane is configured to be connected to the base element through a shape coupling.

18. The machine according to claim 1, also comprising:
a thermal treatment system, including at least one heat exchanger operatively positioned with respect to the at least one container to treat the product thermally;
at least one dispensing tap mounted on an outlet opening of the at least one container.

19. A machine for processing liquid or semi-liquid food products, comprising:
at least one container for containing the product to be processed;
at least one stirrer, mounted inside the at least one container, to rotate about an axis of rotation;
wherein the at least one stirrer comprises at least:
a first protuberance extending parallel to the axis of rotation;
a plurality of scraping elements, each including a cavity for accommodating the first protuberance;
a first locking element, removably connectable to the first protuberance and movable between an engaged position, where the first locking element is locked to the first protuberance to couple the scraping elements to the first protuberance, and a disengaged position, where the first locking element is movable relative to the first protuberance to allow uncoupling the scraping elements;
a second protuberance extending parallel to the axis of rotation;
a vane including a respective cavity for accommodating the second protuberance or an additional plurality of scraping elements, each including an additional cavity for accommodating the second protuberance;
a second locking element, removably connectable to the second protuberance and movable between an engaged position, where the second locking element is locked to the second protuberance to couple the vane or the additional scraping elements to the second protuberance, and a disengaged position, where the second locking element is movable relative to the second protuberance to allow uncoupling the vane or the additional scraping elements;
wherein the first and/or the second locking element comprises a hollow seat for accommodating the first and/or the second protuberance.

20. The machine according to claim 19, wherein the hollow seat has at least one flat face and wherein the first and/or the second protuberance comprises at least a second portion having a respective flat face.

21. The machine according to claim 20, wherein the second portion having the flat face is disposed at an end of the first and/or the second protuberance, respectively.

22. The machine according to claim 20, wherein the first and/or the second protuberance comprises at least a first, cylindrical portion and wherein the scraping elements, and/or the vane or the additional scraping elements, are fitted on the first, cylindrical portion of the first protuberance and/or of the second protuberance, respectively, and wherein the first and/or the second protuberance further comprises at least a third portion with a narrow cross section, interposed between the first, cylindrical portion and the second portion having the flat face.

23. The machine according to claim 22, wherein dimensions of the first, cylindrical portion, the third portion with narrow cross section, the first and/or the second locking element and the scraping elements and/or the vane or the additional scraping elements along a direction parallel to the axis of rotation are such that, in use, the first and/or the second locking element are disposed at the third portion with the narrow cross section.

24. A machine for processing liquid or semi-liquid food products, comprising:
at least one container for containing the product to be processed;
at least one stirrer, mounted inside the at least one container, to rotate about an axis of rotation;
wherein the at least one stirrer comprises at least:
a first protuberance extending parallel to the axis of rotation;
a base element to which at least the first protuberance is attached;
a plurality of scraping elements, each including a cavity for accommodating the first protuberance;
a first locking element, removably connectable to the first protuberance and movable between an engaged position, where the first locking element is locked to the first protuberance to couple the scraping elements to the first protuberance, and a disengaged position, where the first locking element is movable relative to the first protuberance to allow uncoupling the scraping elements, wherein the first locking element includes a flat face;

wherein the first protuberance comprises at least a first, cylindrical portion and wherein the scraping elements are fitted on the first, cylindrical portion of the first protuberance;

wherein the first protuberance comprises at least a second portion having a respective flat face for engaging the flat face of the first locking element;

wherein the second portion having the flat face is distal to the base element, and the first, cylindrical portion is proximal to the base element.

25. A machine for processing liquid or semi-liquid food products, comprising:
at least one container for containing the product to be processed;
at least one stirrer, mounted inside the at least one container, to rotate about an axis of rotation;
wherein the at least one stirrer comprises at least:
a first protuberance extending parallel to the axis of rotation;
a plurality of scraping elements, each including a cavity for accommodating the first protuberance;
a first locking element, removably connectable to the first protuberance and movable between an engaged position, where the first locking element is locked to the first protuberance to couple the scraping elements to the first protuberance, and a disengaged position, where the first locking element is movable relative to the first protuberance to allow uncoupling the scraping elements;
wherein the scraping elements are coupled to each other by interlocking, which prevents the scraping elements from rotating relative to each other.

26. The machine according to claim 25, wherein the scraping elements each include, at least at one portion, an annular seat, defining a coupling zone which allows coupling to another scraping element of the scraping elements to prevent the scraping elements from rotating relative to each other.

27. A machine for processing liquid or semi-liquid food products, comprising:
at least one container for containing the product to be processed;
at least one stirrer, mounted inside the at least one container, to rotate about an axis of rotation;
wherein the at least one stirrer comprises at least:
a first protuberance extending parallel to the axis of rotation;
a plurality of scraping elements, each including a cavity for accommodating the first protuberance;
a first locking element, removably connectable to the first protuberance and movable between an engaged position, where the first locking element is locked to the first protuberance to couple the scraping elements to the first protuberance, and a disengaged position, where the first locking element is movable relative to the first protuberance to allow uncoupling the scraping elements;
a second protuberance extending parallel to the axis of rotation;
a vane including a respective cavity for accommodating the second protuberance;
a second locking element, removably connectable to the second protuberance and movable between an engaged position, where the second locking element is locked to the second protuberance to couple the vane to the second protuberance, and a disengaged position, where the second locking element is movable relative to the second protuberance to allow uncoupling the vane;
wherein the vane is configured to be prevented from rotating relative to the second protuberance;
wherein the vane includes protrusions, configured for preventing the vane from rotating relative to the second protuberance.

28. The machine according to claim 27, wherein the at least one stirrer comprises a base element to which the first and second protuberances are attached and wherein the first and second protrusions are configured to lock the vane to the base element.

29. A machine for processing liquid or semi-liquid food products, comprising:
at least one container for containing the product to be processed;
at least one stirrer, mounted inside the at least one container, to rotate about an axis of rotation;
wherein the at least one stirrer comprises at least:
a first protuberance extending parallel to the axis of rotation;
a plurality of scraping elements, each including a cavity for accommodating the first protuberance;
a first locking element, removably connectable to the first protuberance and movable between an engaged position, where the first locking element is locked to the first protuberance to couple the scraping elements to the first protuberance, and a disengaged position, where the first locking element is movable relative to the first protuberance to allow uncoupling the scraping elements;
a second protuberance extending parallel to the axis of rotation;
a plurality of additional scraping elements, each including an additional cavity for accommodating the second protuberance;
a second locking element, removably connectable to the second protuberance and movable between an engaged position, where the second locking element is locked to the second protuberance to couple the additional scraping elements to the second protuberance, and a disengaged position, where the second locking element is movable relative to the second protuberance to allow uncoupling the additional scraping elements;
wherein the additional scraping elements are coupled to each other by interlocking, which prevents the additional scraping elements from rotating relative to each other;
wherein the additional scraping elements each include, at least at one portion, an additional annular seat, defining a coupling zone which allows coupling to another additional scraping element of the additional scraping elements to prevent the additional scraping elements from rotating relative to each other.

* * * * *